United States Patent [19]

Fisler

[11] 4,075,685

[45] Feb. 21, 1978

[54] EMITTER FOLLOWER VOLTAGE CONTROLLED POWER SUPPLY

[75] Inventor: Charles F. Fisler, New Hartford, N.Y.

[73] Assignee: General Electric Company, Syracuse, N.Y.

[21] Appl. No.: 755,909

[22] Filed: Dec. 30, 1976

[51] Int. Cl.² .............................................. H02M 1/12
[52] U.S. Cl. ...................................................... 363/44
[58] Field of Search ...................... 321/10, 47; 363/39, 363/44, 45

[56] References Cited

U.S. PATENT DOCUMENTS

| | | | |
|---|---|---|---|
| 3,395,317 | 7/1968 | Hanson | 321/10 X |
| 3,600,663 | 8/1971 | Wagner | 321/10 |
| 3,636,433 | 1/1972 | Hyatt | 321/47 X |
| 3,673,487 | 6/1972 | Hendrickson | 321/47 X |
| 3,971,979 | 7/1976 | Mayfield | 321/10 X |
| 3,987,356 | 10/1976 | Steigerwald | 321/10 |

Primary Examiner—William M. Shoop
Attorney, Agent, or Firm—Marvin A. Goldenberg

[57] ABSTRACT

An inexpensive DC power supply including a primary DC voltage source generating a voltage with an inherent ripple content that is coupled to energy receiving circuitry by an emitter follower switching circuit under the control of a secondary DC voltage source of relatively constant voltage amplitude, so as to apply to said energy receiving circuitry a voltage with the constant amplitude characteristics of the secondary voltage source and at relatively high current levels which are generated by the primary voltage source. By adjusting the magnitude of the secondary voltage applied to the emitter follower circuit, ripple may be substantially eliminated from the voltage applied to the energy receiving circuitry by virtue of this applied voltage being established below the ripple component of the primary DC voltage.

3 Claims, 2 Drawing Figures

EMITTER FOLLOWER VOLTAGE CONTROLLED POWER SUPPLY

BACKGROUND OF THE INVENTION

The invention pertains to power supplies for radio receiver circuits and the like that operate from an AC power line for deriving a DC voltage, and in particular to relatively inexpensive power supplies the voltage of which is readily switched on and off by an electronic switch capable of carrying current levels required by the radio receiver circuits. In known power supplies of this type the voltage from the primary AC power source is rectified by a pair of diodes or a diode bridge and filtered by a filter capacitor for reducing, but not totally removing, the ripple component of the rectified voltage. Ripple is an AC voltage component superimposed on the DC voltage. The filtered voltage may then be connected through the electronic switch to the various radio receiver stages. An additional electronic switch of low current capacity, such as multifunction switch of IC construction, may be employed to control the on-off operation of the principal switch. In circuits of this type, the magnitude of the ripple component is inversely related to the size and therefore the cost of the filter capacitor. Thus, the more expensive the capacitor, the more effective its filtering action and the smaller the ripple component. Conversely, to employ a relatively small, inexpensive filter capacitor will normally result in a filtered supply voltage with substantial ripple.

SUMMARY OF THE INVENTION

It is accordingly one object of this invention to provide an improved power supply of the type that converts AC voltage to DC voltage and employs a filter capacitor for filtering out the ripple component, the improvement comprising novel means for effectively reducing the ripple component at minimal increase in cost to the circuit.

It is a further object of this invention to provide a power supply of the type above described that provides a substantially improved ripple component factor while utilizing a relatively inexpensive filter capacitor.

These and other objects of the invention are accomplished in a power supply circuit that includes a primary DC voltage source of the type that converts AC voltage to DC voltage by means of the AC voltage being rectified by a diode network and filtered by a filter capacitor, and wherein an electronic switch is employed to connect the primary DC voltage source to circuitry to be energized, such as the various stages of a radio receiver. The DC voltage available from the rectifier diodes and filter capacitor has an inherent ripple component that is a function of the capacitance of the filter capacitor.

In accordance with the invention, the electronic switch is in the form of a transistor emitter follower circuit, and an available secondary source of DC voltage of relatively constant amplitude, and therefore low ripple content, is coupled at a suitably adjusted voltage level to the emitter follower circuit for the dual purpose of actuating the switching action of the electronic switch, and limiting the DC voltage that is applied to the various stages of the radio receiver circuit to a level below the ripple component of the primary voltage. Accordingly, there is applied to this circuit a voltage having the constant amplitude characteristic of voltage generated by the secondary source and current at the relatively high levels provided by the primary voltage source.

BRIEF DESCRIPTION OF THE DRAWING

While the specification concludes with the claims which particularly point out and distinctly define that subject matter which is regarded as the invention, it is believed the invention will be more clearly understood when considering the following detailed description and the accompanying figures of the drawing in which:

DESCRIPTION OF THE PREFERRED EMBODIMENT

Figure 1:
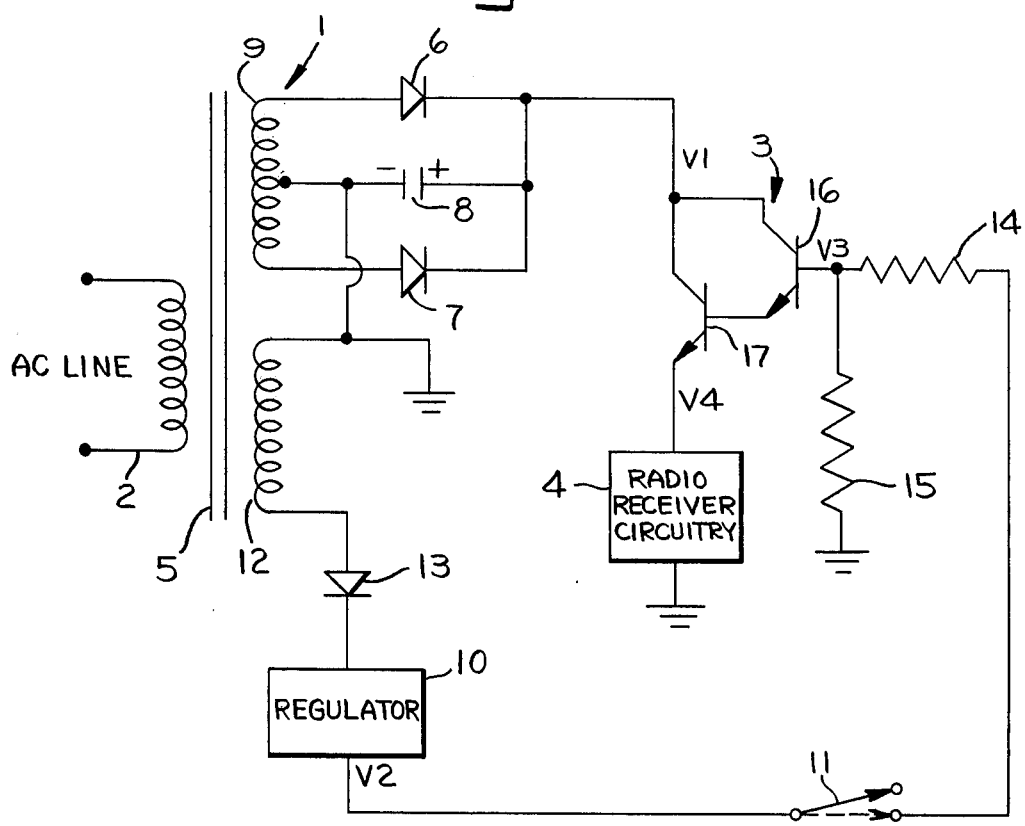
FIG. 1 is a schematic circuit diagram of a power supply circuit, in accordance with the invention.

In the schematic circuit diagram of FIG. 1, there is illustrated a power supply circuit in accordance with the invention having a primary DC voltage source 1 in which an AC voltage, as from an AC power line 2, is converted to a rectified and filtered DC voltage. As will be explained, the primary DC voltage source is connected through an electronic switch 3 to circuitry to be energized, shown in block form as radio receiver circuitry 4, in a manner so as to apply thereto a voltage of low ripple content at currents of suitable level.

In respect to primary DC voltage source 1, a transformer 5, in conventional fashion, couples the AC voltage from line 2 to a rectifier and filter network composed of a pair of rectifier diodes 6 and 7 and a filter capacitor 8. The source 1 is also capable of supplying current levels suitable for use by the radio receiver circuitry 4. The anodes of diodes 6 and 7 are connected to opposite ends of a secondary winding 9 of transformer 5, and the capacitor 8 is connected between the junction of the cathodes of diodes 6 and 7 and a grounded center tap on winding 9. The diodes provide a full wave rectification of the applied AC voltage and the capacitor smooths the rectified voltage. The smoothing action is primarily a function of capacitor size and when using a relatively small inexpensive capacitor there is provided a DC voltage with an inherent ripple content above a given level of voltage that may be substantial. This is shown by the waveform V1 in the graph of FIG. 2 which plots voltage (in volts) versus time (in seconds).

Figure 2:
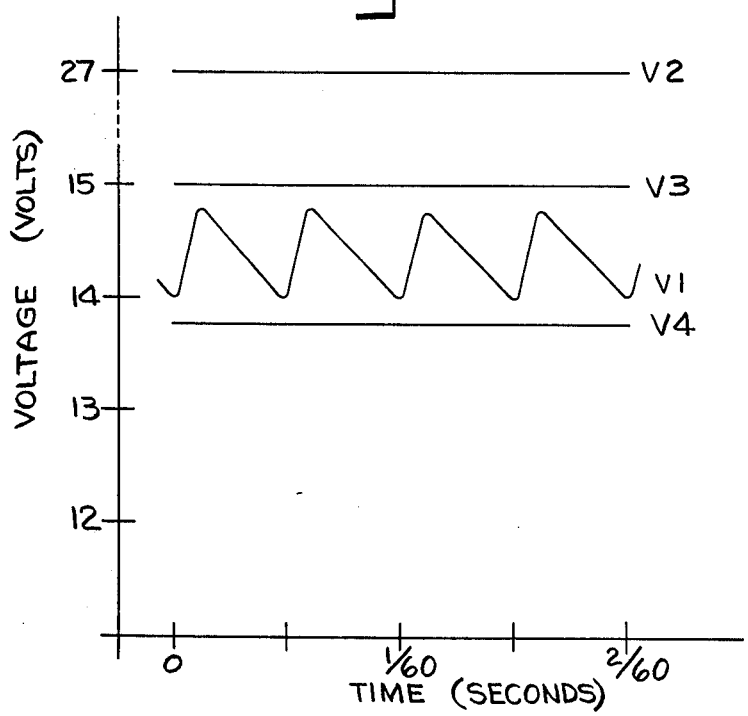
FIG. 2 is a graph of waveforms helpful in explaining the operation of the circuit of FIG. 1.

From FIG. 2, it is seen that for the exemplary embodiment under consideration, the voltage V1 has a peak magnitude of about 14.8 volts with about a 0.8 volt peak to peak ripple component. The magnitude of V1 is principally a function of the AC line voltage and the transformer turns ratio. The magnitude of the ripple component is principally a function of the capacitance of the capacitor 8. In the circuit considered, capacitor 8 has a capacitance of about 200 uf. It is known to reduce the ripple component by increasing the capacitance through an increase in size of the capacitor, which commensurately increases the cost of the circuit. For example, to reduce the ripple component by a factor of five or so would require a capacitance of about 1000 uf in an otherwise identical circuit, doubling to tripling capacitor cost at the indicated voltages.

In accordance with the invention, the electronic switch 3 is employed to selectively connect the DC voltage source 1 to the radio receiver circuitry 4 with a significantly reduced ripple component by means of the switch being operated in response to the voltage from a secondary DC voltage source 10. The voltage source 10, already available for use in other portions of the radio receiver circuitry 4, generates a voltage of relatively constant amplitude characteristics, but normally at low current levels. The switch 3 is an emitter follower circuit capable of conducting relatively high currents, and in the exemplary embodiment under consideration is comprised of a pair of transistors connected in a Darlington configuration, although a simple emitter follower circuit can also be used. In conventional practice, the switch 3 functions solely to selectively apply voltage to the energy receiving circuit, and thereby will provide an on-off operation of the radio. However, in the present circuit the voltage from voltage source 10 controls the electronic switch 3 in a manner such that there is applied to the radio receiver circuitry 4 a voltage with the constant amplitude characteristics of the voltage from secondary source 10 at current levels of primary source 1.

The secondary DC voltage source 10 may be powered from the AC line 2 and transformer coupled through a second secondary winding 12 and a rectifier diode 13. The detailed circuitry of the source 10 is conventional and can take one of a number of known forms for generating a relatively constant amplitude voltage, schematically shown by the waveform V2 in FIG. 2. For example, source 10 may be a highly filtered rectified voltage employing a large filter capacitor, on the order of 2000 uf, or it may be a voltage regulated supply employing zener diodes. In the exemplary embodiment of the invention being considered, the magnitude of the voltage V2 exceeds the peak magnitude of the primary voltage V1. As shown in FIG. 2, the waveform for V2 is a DC voltage of 27 volts and for purposes of illustration is indicated as a straight horizontal line with no ripple. In practice there will be some ripple content, preferably at least one order of magnitude less than that of the primary voltage. The voltage V2 is applied through a second switch 11. Switch 11 is schematically illustrated as a simple mechanical switch but may actually be a known multifunction electronic switch of relatively low current carrying capability, such as an LSI IC circuit, for performing on-off, mode selection and other operations for the radio receiver. The voltage V2 is further applied through a voltage divider network composed of resistors 14 and 15 to the base of the first transistor 16 of the Darlington transistor pair, which is the control electrode of the transistor switch 3. In this configuration, the emitter of transistor 16 is connected to the base of the second transistor 17. The collectors of the two transistors are joined together as the input electrode to receive the voltage V1 and the emitter of transistor 17 is connected as the output electrode of the transistor switch to the radio receiver circuitry 4.

Resistor 14 has one end connected to the switch 11, and the other end which forms a junction with resistor 15 is connected to the base of transistor 16. The other end of resistor 15 is connected to ground. The resistors are proportioned to divide the voltage V2 to a voltage V3 which, when reduced by the two base-emitter voltage drops (Vbe) of transistors 16 and 17, provides at the emitter of transistor 17 a voltage V4 having a magnitude below the ripple component of the voltage V1 and which exhibits the stable amplitude voltage characteristics of voltage V2. This is clearly illustrated in FIG. 2. Thus, there is applied to the radio receiver circuitry 4 a voltage with the excellent amplitude characteristics of the voltage from the secondary source 10, and a current with the capacity of that supplied by primary source 1. Further, because the electronic switch 11 or one similar to it, and the secondary power source 10 were already a part of the existing radio receiver, very little added circuitry is required to gain the very significantly improved voltage characteristic.

It may be appreciated that the circuit and its component values may be modified in various ways within the basic teaching of the present invention, to achieve an improved circuit operation. For example, the voltage V2 may assume any number of different values. Futher, the value of resistor 15 may be selected to ensure that the magnitude of V4 is sufficiently below the ripple component of V1 to be free of ripple but otherwise provide maximum amplitude for best operating efficiency.

What I claim as new and desire to secure by Letters Patent of the United States is:

1. An emitter follower voltage controlled power supply, comprising:
   (a) a primary DC voltage source for generating a voltage with an inherent ripple component above a given level of voltage and having a relatively high current capacity,
   (b) energy receiving circuitry,
   (c) an emitter follower circuit having an input, output and control electrode for switchably connecting said primary DC voltage source to said energy receiving circuitry through said input and output electrodes, said emitter follower circuit developing a voltage drop between said control and output electrodes, during the conduction thereof,
   (d) a secondary DC voltage source independent of said primary DC voltage source for generating a voltage of relatively constant voltage amplitude characteristics and having a relatively low current capacity, and
   (e) circuit means for applying said secondary DC voltage source to the control electrode of said emitter follower circuit at a voltage level less than the sum of said given level and said voltage drop whereby there is applied across said receiver circuitry a voltage with the amplitude characteristics of said secondary DC voltage source and a current with the current capacity of said primary DC voltage source.

2. A voltage controlled power supply as in claim 1 wherein said circuit means includes a voltage divider network for suitably reducing the magnitude of the voltage from said secondary DC voltage source that is applied to said control electrode.

3. A voltage controlled power supply as in claim 2 wherein said emitter follower circuit includes first and second transistors connected in a Darlington configuration in which the base of said first transistor corresponds to said control electrode, the collectors of said first and second transistors are joined and correspond to said input electrode and the emitter of said second transistor corresponds to said output electrode.

* * * * *